(12) United States Patent
Brookes et al.

(10) Patent No.: US 7,104,547 B2
(45) Date of Patent: Sep. 12, 2006

(54) METHOD AND SYSTEM FOR ALIGNING A STATIONARY VEHICLE WITH AN ARTIFICIAL HORIZON

(75) Inventors: Graham R. Brookes, Carmel, IN (US); Daniel L. Nordmeyer, Indianapolis, IN (US); Brian S. Hoaglan, Westfield, IN (US); Greg A. Holbrook, Zionsville, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 0 days.

(21) Appl. No.: 10/513,734

(22) PCT Filed: Apr. 16, 2004

(86) PCT No.: PCT/US2004/011615

§ 371 (c)(1),
(2), (4) Date: Nov. 4, 2004

(87) PCT Pub. No.: WO2005/005178

PCT Pub. Date: Jan. 20, 2005

(65) Prior Publication Data

US 2005/0236781 A1 Oct. 27, 2005

Related U.S. Application Data

(60) Provisional application No. 60/463,487, filed on Apr. 17, 2003.

(51) Int. Cl.
*B60G 17/00* (2006.01)
(52) U.S. Cl. .............................. 280/6.153; 280/5.507; 280/6.154
(58) Field of Classification Search ............. 280/6.153, 280/5.507, 5.514, 6.15, 6.154
See application file for complete search history.

(56) References Cited

U.S. PATENT DOCUMENTS 3,836,161 A 9/1974 Buhl (Continued)

FOREIGN PATENT DOCUMENTS

| DE | 10231245 A1 | 1/2004 |
|----|----|----|
| EP | 1 380 454 A1 | 1/2004 |
| EP | 1380454 A1 | 1/2004 |

OTHER PUBLICATIONS

Accelerometer Fundamentals, Document No. AN-00MX-001 from Memsic, Inc., North Andover, Massachusetts.

*Primary Examiner*—Eric Culbreth
(74) *Attorney, Agent, or Firm*—Fay, Sharpe, Fagan, Minnich & McKee, LLP (57) ABSTRACT

A method of positioning a vehicle chassis of a stationary vehicle in approximate alignment with a predetermined datum is provided. The vehicle has an axle and a fluid suspension system. The fluid suspension system includes a control device, a pressurized fluid source and an exhaust passage. The pressurized fluid source and the exhaust passage are in fluid communication with the plurality of fluid suspension members through the control device. The vehicle also includes an electronic control unit operatively associated with the control device. The method including steps of providing an alignment sensor supported on the chassis for outputting a signal indicative of the orientation of the chassis to the electronic control unit and acquiring a signal output by the alignment sensor. Another step includes comparing the signal from the alignment sensor to alignment data stored in the electronic control unit. A further step includes selectively operating the control device to permit fluid communication between one or more of the fluid suspension members and one of the pressurized fluid source and the fluid exhaust until the signal from the alignment sensor approximately corresponds to the alignment data. A system for performing the method is also discussed.

20 Claims, 10 Drawing Sheets

U.S. PATENT DOCUMENTS

| | | |
|---|---|---|
| 3,917,307 A | 11/1975 | Shoebridge |
| 4,396,202 A | 8/1983 | Kami et al. |
| 4,630,840 A | 12/1986 | Masuda et al. |
| 4,641,843 A | 2/1987 | Morrisroe, Jr. |
| 4,700,303 A | 10/1987 | Tokuyama et al. |
| 4,709,934 A | 12/1987 | Suzuki et al. |
| 4,712,776 A | 12/1987 | Geno et al. |
| 4,718,650 A | 1/1988 | Geno |
| 4,718,695 A | 1/1988 | Kawagoe |
| 4,733,876 A | 3/1988 | Heider et al. |
| 4,783,089 A | 11/1988 | Hamilton et al. |
| 4,798,369 A | 1/1989 | Geno et al. |
| 4,829,436 A | 5/1989 | Kowalik et al. |
| 4,852,861 A | 8/1989 | Harris |
| 4,903,209 A | 2/1990 | Kaneko |
| 4,923,210 A * | 5/1990 | Heider et al. ............ 280/6.153 |
| 4,939,655 A | 7/1990 | Majeed et al. |
| 4,948,166 A | 8/1990 | Kaneko |
| 4,971,360 A | 11/1990 | Pischke et al. |
| 5,025,877 A | 6/1991 | Assh |
| 5,047,938 A | 9/1991 | Yokote et al. |
| 5,058,017 A | 10/1991 | Adachi et al. |
| 5,071,159 A | 12/1991 | Kamimura et al. |
| 5,083,275 A | 1/1992 | Kawagoe et al. |
| 5,130,927 A | 7/1992 | Kunishima et al. |
| 5,141,245 A | 8/1992 | Kamimura et al. |
| 5,142,897 A | 9/1992 | Pischke et al. |
| 5,161,579 A | 11/1992 | Anderson |
| 5,176,391 A * | 1/1993 | Schneider et al. ....... 280/6.153 |
| 5,180,024 A | 1/1993 | Eto |
| 5,184,841 A | 2/1993 | Pischke et al. |
| 5,193,063 A | 3/1993 | Assh |
| 5,216,364 A | 6/1993 | Ko et al. |
| 5,220,505 A | 6/1993 | Yokote et al. |
| 5,220,982 A | 6/1993 | Anderson |
| 5,228,704 A | 7/1993 | Tabe |
| 5,229,829 A | 7/1993 | Nihei et al. |
| 5,267,466 A | 12/1993 | Morris |
| 5,287,277 A | 2/1994 | Mine et al. |
| 5,322,321 A | 6/1994 | Yopp |
| 5,344,189 A | 9/1994 | Tanaka et al. |
| 5,373,445 A | 12/1994 | Yopp |
| 5,374,037 A | 12/1994 | Bledsoe |
| 5,430,647 A | 7/1995 | Raad et al. |
| 5,452,919 A | 9/1995 | Hoyle et al. |
| 5,461,564 A | 10/1995 | Collins et al. |
| 5,465,209 A | 11/1995 | Sammut et al. |
| 5,499,845 A | 3/1996 | Geiger et al. |
| 5,517,847 A | 5/1996 | Campbell et al. |
| 5,530,648 A | 6/1996 | Lavey |
| 5,560,591 A | 10/1996 | Trudeau et al. |
| 5,642,043 A | 6/1997 | Ko et al. |
| 5,652,703 A | 7/1997 | Kawazoe |
| 5,696,678 A | 12/1997 | Raad et al. |
| 5,707,045 A | 1/1998 | Easter |
| 5,860,450 A | 1/1999 | Trudeau et al. |
| 5,913,525 A * | 6/1999 | Schneider et al. ....... 280/6.153 |
| 6,050,573 A * | 4/2000 | Kunz ..................... 280/6.153 |
| 6,098,967 A | 8/2000 | Folchert |
| 6,098,995 A | 8/2000 | Danis |
| 6,098,996 A | 8/2000 | Perlot |
| 6,116,586 A | 9/2000 | Westerkamp et al. |
| 6,173,974 B1 | 1/2001 | Raad et al. |
| 6,176,495 B1 | 1/2001 | Decker |
| 6,224,044 B1 | 5/2001 | Heilenkötter et al. |
| 6,234,493 B1 | 5/2001 | Kleen et al. |
| 6,260,860 B1 | 7/2001 | Brookes et al. |
| 6,264,213 B1 | 7/2001 | Kutscher |
| 6,314,353 B1 | 11/2001 | Ohsaku et al. |
| 6,327,525 B1 | 12/2001 | Pauli et al. |
| 6,332,623 B1 | 12/2001 | Behmenburg et al. |
| 6,356,075 B1 | 3/2002 | Shank |
| 6,369,583 B1 | 4/2002 | Sommer et al. |
| 6,418,363 B1 | 7/2002 | Cochofel et al. |
| 6,428,026 B1 | 8/2002 | Smith |
| 6,431,557 B1 | 8/2002 | Terborn et al. |
| 6,470,248 B1 | 10/2002 | Shank et al. |
| 6,471,196 B1 | 10/2002 | Stiller |
| 6,584,385 B1 | 6/2003 | Ford et al. |
| 6,669,217 B1 | 12/2003 | Sorum et al. |
| 6,684,138 B1 | 1/2004 | Friede et al. |
| 6,948,722 B1 | 9/2005 | Sproatt et al. |
| 2001/0003386 A1 | 6/2001 | Stiller |
| 2001/0005803 A1 | 6/2001 | Cochofel et al. |
| 2001/0017449 A1 | 8/2001 | Stiller |
| 2002/0035423 A1 | 3/2002 | Shank et al. |
| 2002/0079626 A1 | 6/2002 | Grotendorst et al. |
| 2002/0096840 A1 | 7/2002 | Sulzyc et al. |
| 2003/0023357 A1 | 1/2003 | Trudeau et al. |
| 2003/0173750 A1 | 9/2003 | Sorum et al. |
| 2004/0061293 A1 | 4/2004 | Barbison |
| 2005/0161891 A1 | 7/2005 | Trudeau et al. |

* cited by examiner

METHOD AND SYSTEM FOR ALIGNING A STATIONARY VEHICLE WITH AN ARTIFICIAL HORIZON

This application claims priority from U.S. Provisional Patent Application No. 60/463,487 filed on Apr. 17, 2003, which is hereby incorporated herein by reference in its entirety.

BACKGROUND

The present invention broadly relates to air suspension systems and, more particularly, an electronically controlled air suspension system for use in association with a stationary vehicle that adjusts the air springs of the stationary vehicle to place the vehicle chassis thereof in substantial alignment with an artificial horizon or other predetermined datum.

The present invention finds particular application in association with the use of larger mobile vehicles, such as recreational vehicles (RVs), travel trailers and over-the-road truck trailers, for example, and will be described herein with particular reference thereto. However, it is to be understood that such vehicles are simply exemplary structures and that the present invention is capable of broader application in association with the alignment of a wide variety of structures and vehicles. Further examples of such structures and vehicles include gun platforms, military and civilian personnel transport vehicles, and ambulances.

Many larger vehicles, such as RVs, travel trailers, over-the-road truck trailers and the like, have an air suspension system for regulating the height of the vehicle chassis relative to the supporting axles, in a manner that is dependent upon the load placed in the vehicle, to adjust the height of the chassis in response to the ride conditions experienced by the vehicle. These suspension systems usually consist of a plurality of fluid suspension members, such as air springs, which support the vehicle chassis above the axles. The height of the air springs is controlled by the ingress and egress of pressurized fluid from a suitable source mounted on the vehicle, such as a compressor. One or more intervening valves are traditionally used to facilitate the ingress and egress of pressurized fluid respectively into and out of the air springs, thus adjusting the height of the air springs and correspondingly the position of the vehicle chassis relative to the vehicle axles. Such systems also enable the vehicle chassis to be maintained in an orientation substantially aligned with the axles while the vehicle is stationary. This is accomplished by individually regulating the heights of the air springs that support the vehicle chassis on the axles. One disadvantage of such systems, though, is that the chassis can only be positioned relative to the axles. So, if the axles are disposed in an undesirable orientation, the chassis, though level with the axles, will also be disposed in an undesirable orientation.

As an alternative, many of these vehicles, such as RVs, will also use a plurality of hydraulic jacks, which are lowered in order to level the floor of the RV when in a stationary, parked condition. However, in certain situations, the use of hydraulic jacks is not permitted, such as when the RV is parked on an asphalt parking lot since the jacks could damage the asphalt. Thus, leveling of the vehicle cannot be accomplished under these circumstances. Another disadvantage is the cost associated with these systems, as few of the standard components of the vehicle are utilized therein. That is, the hydraulic jacks, the control valves, the hydraulic lines, the electronic control unit, and the user interface, as well as other components, must be installed on the vehicle, over and above all of the standard components that are already installed. Thus, these extra components increase the cost of the vehicle in order to obtain the leveling feature.

Also, some RVs may use the existing suspension air springs to adjust the floor height and to level the floor by the use of mercury switches, or other controls which will raise and lower certain of the air springs to regulate the height of the floor with respect to the vehicle axles until a level condition is reached. Some examples of such fluid actuated leveling systems for trailers, RVs, etc., are shown in U.S. Pat. Nos. 5,228,704, 5,465,209, 5,180,024, 5,499,845, 6,431,557, and 6,428,026. However, it will be appreciated that these systems may be useful in situations where weight distribution changes in a parked or otherwise stationary vehicle. However, these systems remain ineffective for leveling a vehicle chassis when the axles of the vehicle are not themselves in a level orientation.

The above-listed patents disclose numerous leveling and suspension control systems for air springs in vehicles, some of which are operational while the vehicle is moving, while others are actuated when the vehicle is stationary. Most of these systems use the air springs to regulate the height of the vehicle chassis with respect to the axles or the wheel supporting structure in order to achieve a level condition. Also, many of these systems require separate control systems which are in addition to the existing suspension components and pneumatic ride control system of the vehicle.

For at least these reasons, it is considered desirable to develop an air suspension system that overcomes these as well as other disadvantages.

BRIEF DESCRIPTION

A method of positioning a vehicle chassis of a vehicle in approximate alignment with a predetermined datum is provided. The vehicle has an axle and a fluid suspension system. The fluid suspension system consists of a plurality of fluid suspension members, a control device, a pressurized fluid source and an exhaust passage. The fluid suspension members are disposed between the axle and the chassis of the vehicle. The pressurized fluid source and the exhaust passage are in fluid communication with the plurality of fluid suspension members through the control device. The vehicle also includes an electronic control unit operatively associated with the control device. The method includes steps of providing an alignment sensor supported on the chassis for outputting a signal indicative of the orientation of the chassis to the electronic control unit and acquiring a signal output by the alignment sensor. Another step includes comparing the signal from the alignment sensor to alignment data stored in the electronic control unit. A further step includes selectively operating the control device to permit fluid communication between one or more of the fluid suspension members and one of the pressurized fluid source and the fluid exhaust until the signal from the alignment sensor approximately corresponds to the alignment data.

A control system adapted to position a vehicle chassis of a stationary vehicle in substantial alignment with a predetermined datum is provided and includes a plurality of fluid suspension members adjustably supporting the chassis on an axle of the stationary vehicle. A pressurized fluid source is operatively connected to the fluid suspension members. A control device is operatively connected between the fluid source and the fluid suspension members for controlling pressurized fluid flow to and from the fluid suspension members. An alignment sensor is supported on the chassis for outputting a signal indicative of the orientation of the chassis. An electronic control unit is operatively connected to the control device and the alignment sensor. The electronic control unit is for receiving the signal from the alignment sensor and selectively activating the control device to adjust one or more of the fluid suspension members until the signal from the alignment sensor is indicative of the chassis being approximately aligned with the predetermined datum.

A method of positioning a vehicle chassis of a stationary vehicle in approximate alignment with a predetermined datum is provided. The vehicle has an axle and a fluid suspension system. The fluid suspension system includes a plurality of fluid suspension members, a control device, a pressurized fluid source and an exhaust passage. The fluid suspension members are disposed between the axle and the chassis of the vehicle. The pressurized fluid source and the exhaust passage are in fluid communication with the plurality of fluid suspension members through the control device. The vehicle also includes an electronic control unit operatively associated with the control device. The method includes steps of providing an alignment sensor supported on the chassis for outputting a signal indicative of the orientation of the chassis to the electronic control unit and acquiring a signal output by the alignment sensor. Another step includes comparing the signal from the alignment sensor to alignment data stored in the electronic control unit. A further step includes selectively operating the control device to permit fluid communication between one or more of the fluid suspension members and one of the pressurized fluid source and the fluid exhaust until the signal from the alignment sensor approximately corresponds to the alignment data.

The present invention provides an electronic control system for leveling a vehicle chassis, such as the frame, subframe, floor and/or body of an RV or over-the-road trailer, for example, which uses the existing air suspension components for the vehicle ride system, avoiding additional and costly duplicate components and additional space usage in order to provide the desired leveling effect for the vehicle chassis, especially when the vehicle is stationary.

Another feature of the invention is to provide a leveling system that requires only the addition of an alignment sensor or other level detection device, such as an accelerometer, tilt sensor, gyro, or similar type sensor, for example. The alignment sensor is supported on the vehicle chassis and operationally connected with an electronic control unit (ECU), which is used to control the ride suspension system in combination with software for the ECU for performing a method of the present invention.

Still another feature of the invention is to provide a horizon leveling control system that aligns the vehicle chassis with respect to an artificial horizon or other predetermined datum independent of the distance of the vehicle chassis from the axles or wheels, by introducing this artificial horizon or predetermined datum into the software of the ECU.

Another feature of the invention is to provide the system with an interlock via the standard height leveling system to ensure that the ECU automatically disengages the horizon leveling system of the invention and goes to the normal ride height leveling upon movement of the vehicle or placement of the vehicle in a transmission gear in preparation for subsequent movement.

A further aspect of the invention is to enable the system to determine whether the individual air springs have sufficient travel to enable the vehicle to achieve a level condition after the tilt or orientation of the vehicle is initially determined by the system before attempting to perform the actual leveling by introducing or exhausting air into or from selected air springs.

A further feature of the invention is the ability to regulate the heights of the individual air springs in a particular sequence, such as initially adjusting for large magnitudes of unevenness by adjusting the air springs on one side of the vehicle, after which smaller magnitudes of height can be compensated for by individually adjusting either the front or rear air spring on the selected one side of the vehicle.

Still another advantage of the present invention is to enable the system to initially exhaust air from the air springs on a high side or corner of the vehicle after the unevenness is detected by the level detection device, prior to introducing additional pressurized fluid into one or more of the air springs to raise a lower side, thereby reducing the depletion of the supply of pressurized fluid and minimizing additional work by the vehicle compressor.

In summary, the invention provides a horizon leveling system that utilizes most of the features and components of the air suspension ride system of a vehicle, such as an RV, travel trailer or over-the-road trailer, for example, by the addition of a level detection device and by programming the ECU with an artificial horizon or other predetermined datum. The present system is adapted to adjust the orientation of the vehicle chassis into alignment with the artificial horizon irregardless of the position of the vehicle axles.

The foregoing advantages, construction and operation of the present invention will become more readily apparent from the following description and the accompanying drawings.

BRIEF DESCRIPTION OF THE DRAWINGS

FIG. 2, which includes subfigures 2A, 2B, and 2C, is a flow diagram of one method of the present invention for carrying out the alignment of a vehicle chassis.

FIG. 3, which includes subfigures 3A, 3B, and 3C, is a flow diagram of a modified method for alignment of the vehicle chassis.

Similar numerals refer to similar parts throughout the drawings.

DETAILED DESCRIPTION

It is to be understood that the term chassis, as recited herein, generally refers to the sprung mass of the vehicle, which typically includes one or more of the components supported on the fluid suspension members. This can include, but is not limited to, a frame, a subframe, a floor and/or a body of the vehicle, for example. Additionally, the terms level, leveling and the like as used herein, such as in the term "horizon leveling," for example, are not intended to be in any way limited to horizontal or vertical leveling. Rather, such terms refer to substantial alignment with a predetermined datum regardless of the orientation of the predetermined datum.

Figure 1:
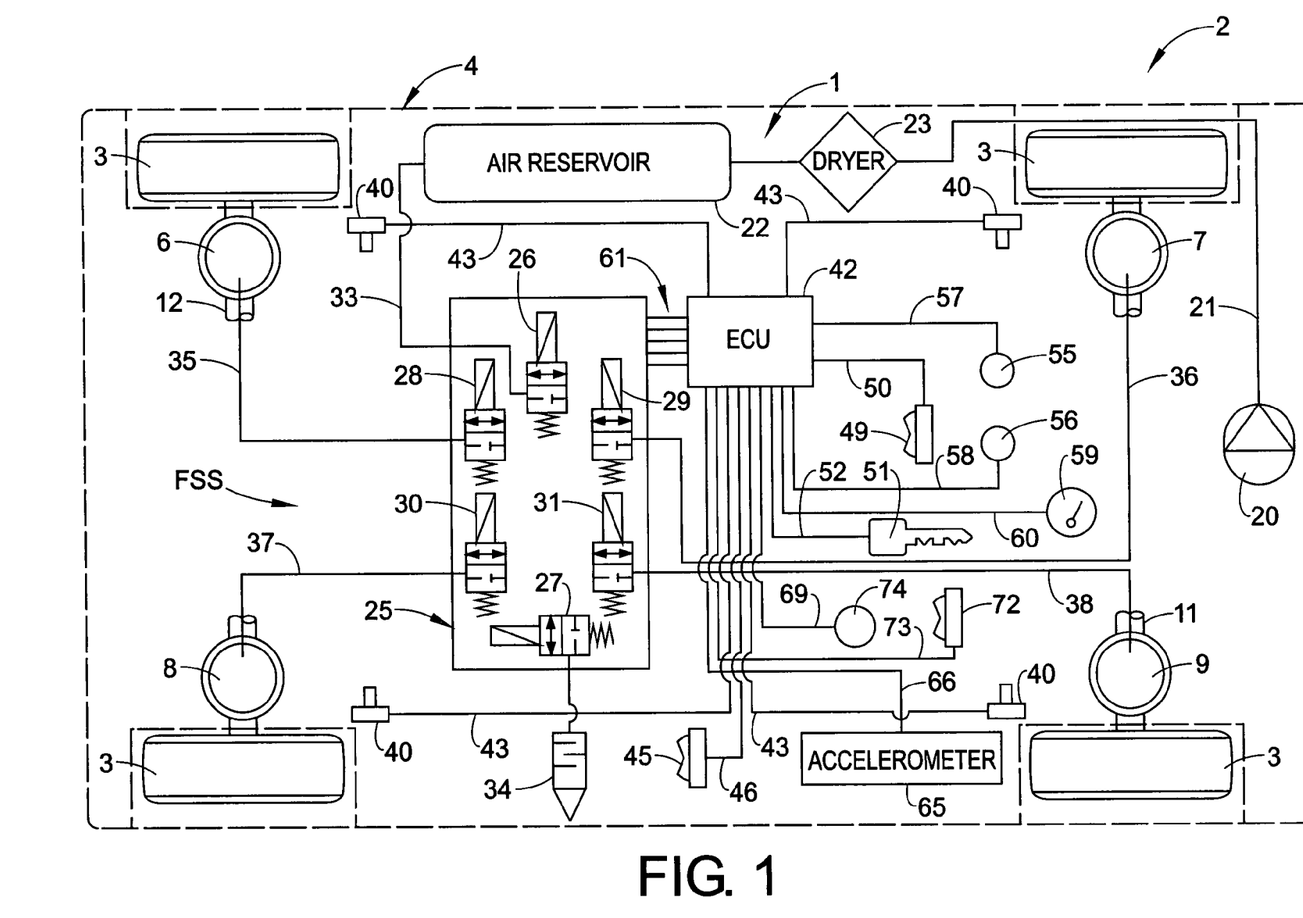
FIG. 1 is a schematic diagram of the horizon leveling system and components thereof mounted on a traditional dual axle vehicle.

FIG. 1 is a diagrammatic representation of the horizon leveling system of the present invention which is indicated generally at 1, and illustrated as being used on a vehicle 2, such as an RV, for example. However, system 1 can be used on other types of vehicles such as travel trailers, over-the-road truck trailers, ambulances, and personnel transport vehicles, for example. The system can also be used on stationary equipment, such as a gun platform, for example, that is supported on fluid suspension members, such as air springs, for example. Vehicle 2 includes a plurality of wheels 3, one of which is illustrated on each corner of the vehicle, and a fluid suspension system FSS. The fluid suspension system includes air springs 6, 7, 8 and 9 mounted adjacent each wheel 3 on the ends of supporting front and rear axles 11 and 12 and supports a vehicle chassis 4 thereon. For smaller vehicles, only a single axis having a pair of air springs may be utilized. However, for most RVs or other large pieces of equipment or vehicles, at least a pair of axles will be utilized having one or more air springs adjacent each end thereof.

The air springs are of a usual construction having a pair of spaced end members 15 and 16 (FIGS. 5 and 6) with an intervening flexible sleeve 17 forming an internal fluid chamber. Some examples of known air springs are shown in U.S. Pat. Nos. 5,374,037, 4,852,861, and 4,718,650, which are incorporated herein by reference. Air-over-damper type suspension members also can be used within the scope of the present invention, such as is shown in U.S. Pat. No. 4,712,776 and which is incorporated herein by reference.

Leveling system 1 includes a compressor 20, which can be electrically operated or driven by the engine of the vehicle or in another suitable manner, to supply pressurized fluid, usually air, through a supply line 21 to a reservoir or supply tank 22. It will be appreciated that such compressors are known to be operable independent of the engine of the vehicle. A dryer 23 can optionally be included and is preferably fluidically interconnected along line 21 for removing moisture from the pressurized fluid prior to entering reservoir 22. If desired, pressurized fluid can be supplied directly to the air springs from the compressor without first going to reservoir 22.

A main control valve assembly 25 includes an inlet valve 26, an exhaust valve 27 and individual air spring control valves 28, 29, 30 and 31. Inlet valve 26 is in fluid communication with reservoir 22 through fluid supply line 33 and exhaust valve 27 is in fluid communication with an exhaust silencer 34. Individual control valves 28, 29, 30 and 31 are connected in fluid communication with individual air springs 6, 7, 8 and 9, respectively, by fluid lines 35, 36, 37 and 38, respectively. It is to be distinctly understood that valve assembly 25 described above and illustrated in FIG. 1 is merely one example of a suitable valve assembly and that any other suitable arrangement can be used without departing from the principles of the present invention. For example, multi-position valves, such as 2-way or 3-way valves for example, could be used in place of one or more of the control valves shown and described.

Figure 6:
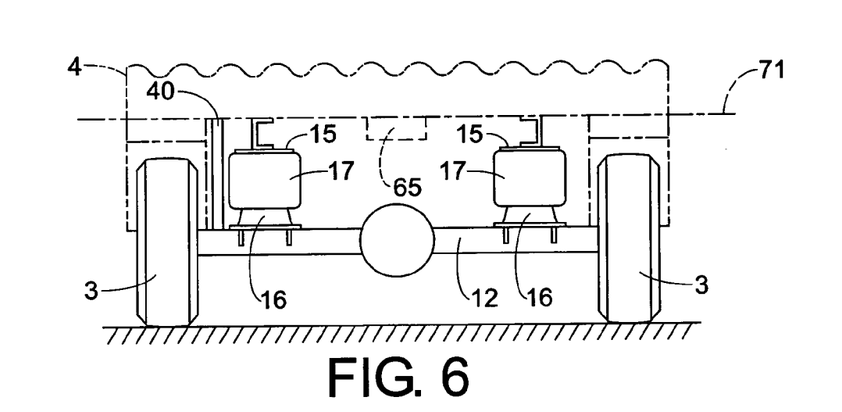
FIG. 6 is an enlarged fragmentary sectional view taken on line 6—6 in FIG. 5.

Each of the air springs can optionally have a height sensor or detector, indicated generally at 40, associated therewith that can be any one of various known constructions. Height sensors 40 could utilize the Hall effect, sonics, infrared, resistance, or the like, that operate on, in or merely in association with the air springs and of which all are well known in the air spring art. Some examples of such air spring height detectors that are part of an air spring itself are shown in U.S. Pat. Nos. 5,707,045, 5,229,829, and 4,798,369, which are incorporated herein by reference. However, as shown in FIG. 6, height sensor 40 can be a separate component externally supported on the vehicle and extending between spaced-apart portions of the vehicle, such as between the axle and chassis or vehicle body, for example. Each height sensor 40 is preferably supported adjacent one of the individual air springs and is also in communication with an electronic control unit (ECU) 42, such as by a control line 43. Additionally, an end-of-travel signal can be output by the height sensors indicating that one of the extreme positions, such as fully extended or fully compressed, for example, of the associated air spring has been reached or is being approached. Alternately, end-of-travel data can be determined by the ECU based upon a comparison of the signal from the height detector with known end-of-travel values stored within the ECU. ECU 42 is shown in FIG. 1 as being connected to an optional service switch 45 by control line 46 for selectively actuating the hydraulic jacks that are optionally provided on many RVs. Optionally, the switch can also include ON and/or OFF positions (FIG. 8) for the automatic leveling system used during operation of the vehicle. ECU 42 also is connected to a height switch 49 by a control line 50, to the key actuated vehicle ignition switch 51 by a control line 52, and to a pair of indicating lights 55 and 56 by control lines 57 and 58, respectively. Height switch 49 can optionally be a multi-position height selection switch for use when the vehicle is selectively operable at a plurality of heights. ECU 42 also is operatively connected to the vehicle speed indicator or speedometer 59 by a control line 60, and to the individual air spring control valves in valve control unit 25 by a plurality of control lines, indicated collectively at 61. As such, ECU 42 is adapted to selectively actuate one or more of the plurality of valves. It will be appreciated that any suitable speed or movement indicating device can be operatively connected to the ECU in addition to or as an alternative to speedometer 59.

Many of the above-described components and manner of use are standard on many vehicle air suspension systems used for RVs and trailers to provide a multi-position leveling system and desired ride characteristic for the vehicle. Additionally, it will be appreciated that communications to and from the various devices and components of the vehicle, such as ECU 42, height switch 49 and speedometer 59, for example, can be transmitted in any suitable manner. For example, each of the devices and components can be hardwired to one another as prescribed by each of the various systems operative on the vehicle, with the signals communicated between the devices and components along the individual wires. As an example, if five different systems of the vehicle rely upon a signal from the speedometer, five different wires may be interconnected to the speedometer to provide the signal output by the speedometer to each of the systems directly. However, many vehicles now include a CAN bus communication system that networks the various devices and components together. Such CAN bus communications systems are well known and commonly used. These systems can include a standalone controller or alternately be integrated into another controller of the vehicle, such as ECU 42, for example. One example of a suitable standard or protocol for such systems is SAE J1939. Though, it will be appreciated that a variety of other protocols exist and could alternately be used, such as CANOpen and DeviceNET, for example. One advantage of using a CAN bus communication system is that the actual physical wiring of the vehicle is greatly simplified. Another advantage is that the addition of a new device and/or system can be accomplished without significant physical modification of the vehicle. For example, the new system can be added to the vehicle simply by suitably mounting a new device on the vehicle, placing the device into communication with the CAN bus communication system, and making any attendant software and/or firmware modifications to the existing devices and/or components. Once installed, the new system can send and receive any other signals, information and/or data through the CAN bus communication system to operate the newly added system.

Figure 5:
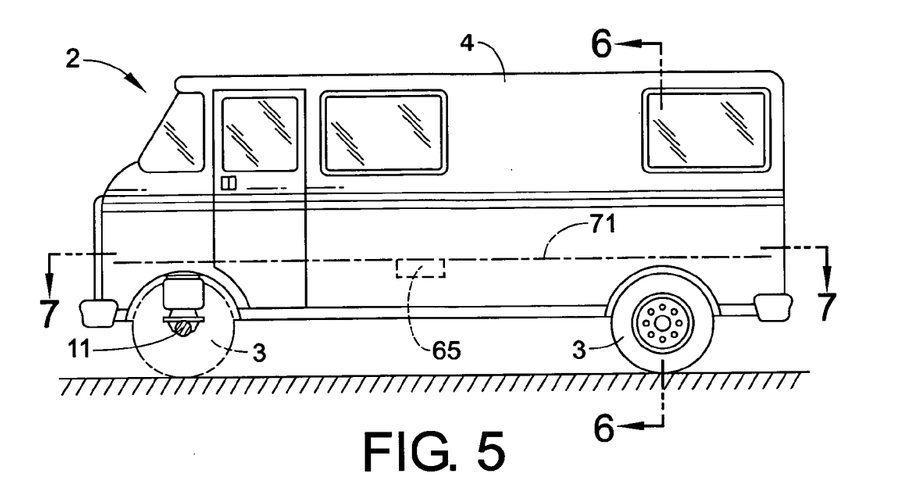
FIG. 5 is a diagrammatic side view of a vehicle to be aligned by the method and system of the present invention.
Figure 7:
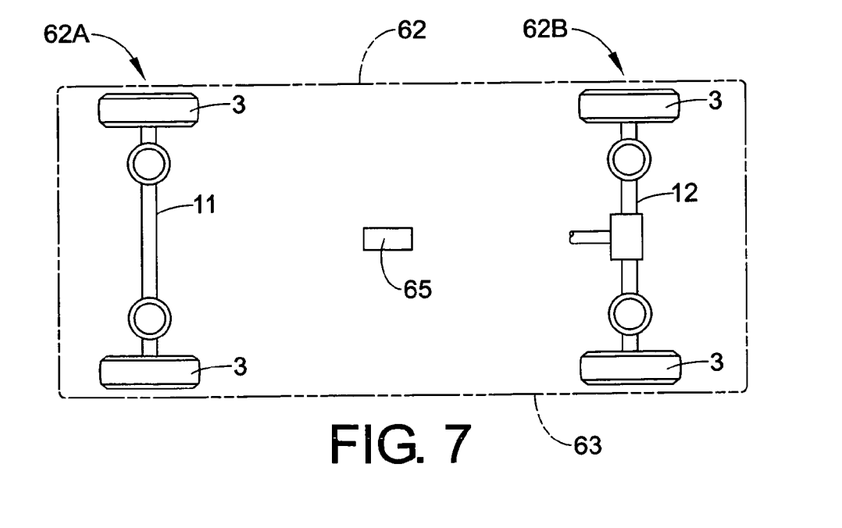
FIG. 7 is a diagrammatic view looking in the direction of line 7—7 in FIG. 5.

In accordance with the invention, an alignment sensor or level detection device, which is indicated generally at 65 and shown diagrammatically in FIGS. 5–7, is mounted on or operatively connected to vehicle chassis 4. Device 65 provides an alignment signal to ECU 42 through a control line 66. The alignment signal is indicative of the orientation of the vehicle chassis. Level detection device 65 can be of any suitable type of apparatus, such as an accelerometer, tilt sensor, gyroscopic sensor, and a transducer or other device that can detect the position, orientation or amount of tilt of a structural body and provide a signal, such as a relative voltage or current, as to the approximate position, orientation or amount of tilt of the structural body associated therewith. One particular type of level detection device is a dual-axis accelerometer manufactured by Memsic, Inc. of North Andover, Mass., identified as model MXR299ML. This sensor operates on a thermal principle, generating a signal, such as an output voltage, for example, for both the X-axis and Y-axis that varies according to the angular orientation of the sensor. Accelerometer 65 provides an analog or digital value or signal that is dependent upon the tilt or out of level of the vehicle chassis upon which the sensor is supported. This signal is supplied to ECU 42 through line 66. Accelerometer 65 can be attached to any part of the vehicle chassis without effecting the invention. For example, the accelerometer could be secured to a portion of a frame, such as a cross beam, or to a portion of the body, such as a roof, side wall or floor. Additionally, the accelerometer can optionally be mounted centrally on the vehicle chassis. However, central mounting is not required.

Thus, in accordance with one of the features of the invention, a typical air suspension system for a vehicle as described above, is utilized without material modifications thereto with the exception of incorporating an alignment sensor or level detection device 65 that is operationally connected to ECU 42, in combination with the appropriate software utilized by ECU 42, to provide the features set forth in FIGS. 2–4, and discussed below.

Figure 8:
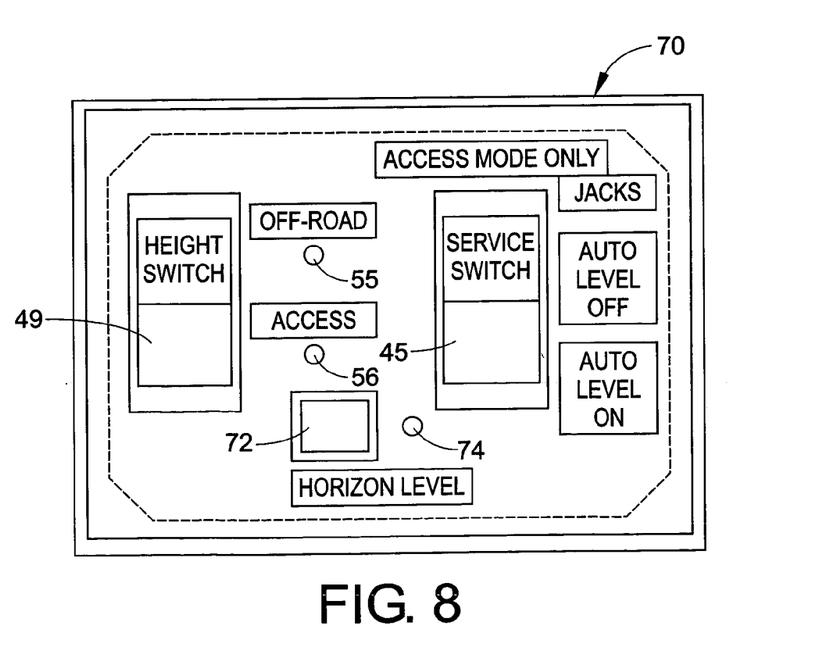
FIG. 8 is a diagrammatic plan view of the suspension system and control panel located within the vehicle.

FIG. 8 represents a type of control panel 70 which can be located on the dashboard of the vehicle for controlling both the ride suspension system for the vehicle during the dynamic operation thereof as well as the horizon leveling system of the present invention. Panel 70 includes height switch 49 that controls the usual ride leveling system for the vehicle, indicating lights 55 and 56, the service switch 45, and a horizon leveling switch 72 that is connected to ECU 42 by a control line 73 (FIG. 1). An indication light 74 is connected to ECU 42 by a control line 69. Service switch 45 will be moved to one of three positions as shown in FIG. 8. The switch position can be illuminated by back lighting to indicate the selected position. If desired, panel 70 could be a touch screen which would eliminate the toggle or rocker switches discussed above.

In accordance with one of the features of the invention, an artificial level position or horizon is indicated schematically by dot-dash line 71 (FIGS. 5 and 6). This artificial horizon is programmed into ECU 42 as the predetermined datum. The predetermined datum is an imaginary reference plane that the system uses to align the vehicle chassis irrespective of the orientation of the axles, wheels of the vehicle or the supporting ground. Though line 71 shown in FIGS. 5 and 6 as being substantially horizontal, it will be appreciated that line 71 could be disposed in any desired orientation as established hereinbefore.

Figures 2, 2A:
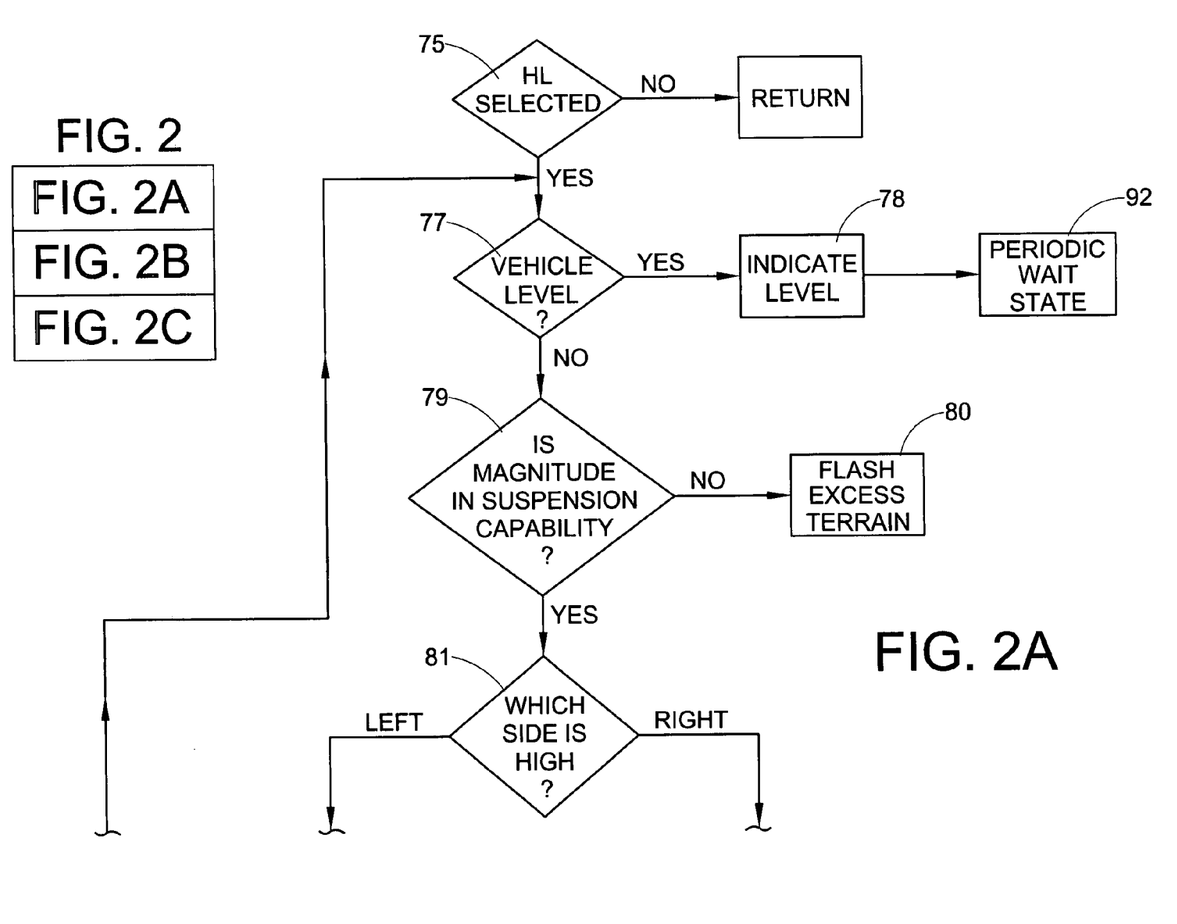
Figures 3, 3A:
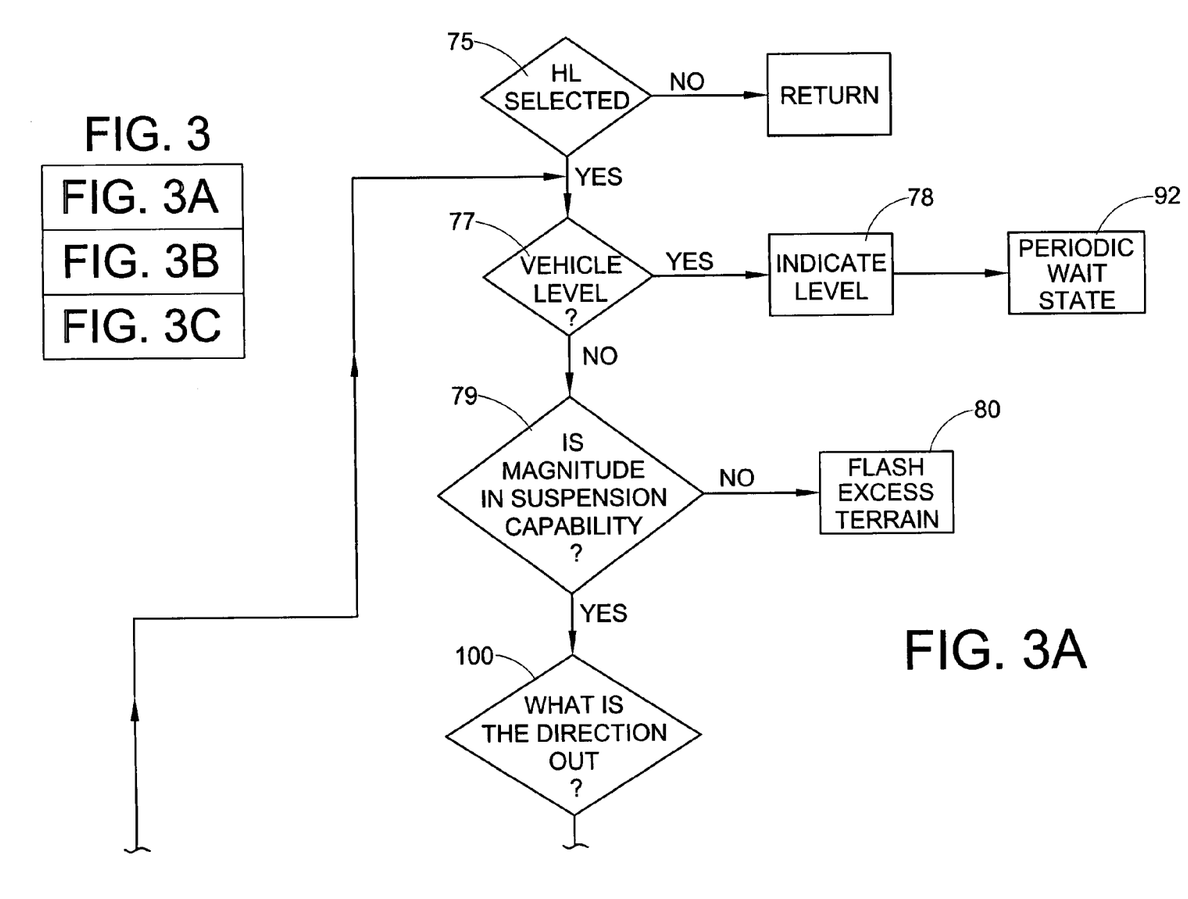

The steps for carrying out one embodiment of the present invention are illustrated in FIG. 2, with a second embodiment being illustrated in FIG. 3, by the flow charts contained therein. Referring to FIG. 2, the vehicle operator, after the vehicle comes to a stop in an area such as a parking lot, campground, or the like, will actuate the horizon leveling system by actuating control switch 72 located on panel 70 in the cab portion of the vehicle, as indicated by block 75 (FIG. 2A). In one preferred arrangement, this is done by depressing and holding control switch 72 for a predetermined period of time. A similar button hold can also be used to disengage the system. Thus, the opportunity for inadvertently initiating (or alternately, disengaging) the system, such as by bumping the switch, for example, is minimized. One example of a suitable duration for holding the switch in the depressed position is from about 3 to about 10 seconds and preferably about 4 seconds.

ECU 42 initially determines whether the vehicle chassis is aligned with the predetermined datum at block 77 by comparing the signals received from accelerometer 65 with respect to the artificial horizon 71 preset in ECU 42. If the vehicle floor or other reference plane is within an acceptable range on either side of artificial horizon 71, the ECU will send a signal and actuate indicator light 74, as represented by block 78, which will visually advise the driver that the vehicle is properly aligned. If the ECU senses that the vehicle chassis is out of alignment with the predetermined datum, it will then determine if the magnitude that the vehicle chassis is out of alignment is within the capability of the system to correct at block 79. If outside the capability of the system, it will send a signal to the operator, such as an audible tone or a flashing light 74, as shown by block 80, which immediately advises the driver that the vehicle is excessively uneven and that the suspension system will not be able to sufficiently compensate for the uneven terrain on which the vehicle is currently parked. The driver can then reposition the vehicle at that location or go to a different, more level location. If the out-of-level signal generated by accelerometer 65 is within the capability of the system to correct, the ECU will then proceed to block 81 where it will detect which side of the vehicle is above artificial horizon 71, that is, right side 62 or left side 63, as shown in FIG. 7.

Figure 9:
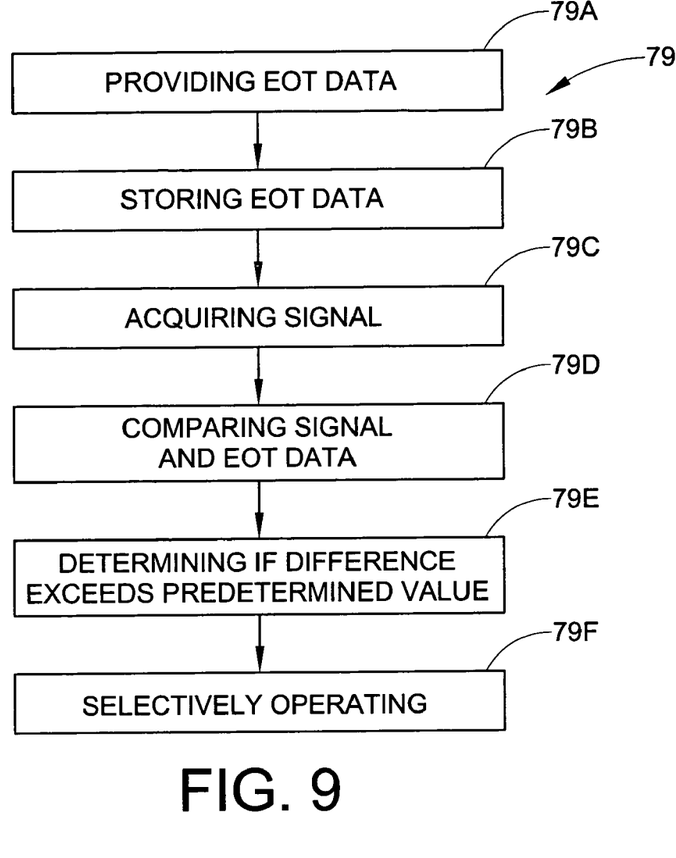
FIG. 9 is a flow diagram of one exemplary method of determining if an adjustment is within the capability of a suspension system.

One example of performing block 79 is shown in FIG. 9 and includes a block 79A of providing end-of-travel data, such as from a height sensor, for example, indicative of one of the extreme positions of an air spring. Block 79 can also include a block 79B of storing the end-of-travel data in an ECU, for example. Block 79 can further include a block 79C of acquiring a signal indicative of the orientation of the vehicle chassis, such as from a height detector or an alignment sensor, for example. Block 79 can include still a further block 79D of comparing the signal indicative of orientation to the stored end-of-travel data. Still a further block 79E of determining if any difference between the signal and the end-of-travel data exceeds a predetermined value can be included in performing block 79. Another block 79F of selectively operating the control device to discontinue pressurized fluid flow if the predetermined value is exceeded can also be included in block 79.

Upon determining at block 81 which is the high side of the vehicle, a determination then is made at block 82 (assuming for the purpose of this description that the right side was determined to be the high side) as to whether the amount of unevenness is within the capability of the suspension system to correct. If a determination is made that the right side can be lowered sufficiently at block 82, a signal is then sent via block 83 to block 84 (FIG. 2C) to determine if the front 62A or the rear 62B of right side 62 is out of alignment. After the determination is made at block 84 that the front or rear is out of alignment, block 85 determines whether it can be lowered sufficiently to correct for the detected unevenness, and if permissible, block 86 provides the signal to lower the appropriate air spring by exhausting air therefrom, such as from air spring 6 since this is the air spring on the rear right side of the vehicle chassis.

If the right side 62 cannot be lowered sufficiently, block 88 (FIG. 2B) determines if the opposite side 63 can be raised sufficiently to compensate for the unevenness. If not, block 89 flashes indicating light 74 alerting the driver that the system is still checking if the proper alignment can be achieved. If left side 63 can be raised sufficiently, block 90 through block 84 then determines, as discussed above, if the front or rear of the left side is out of alignment, and whether it can be lowered to reach the desired aligned position.

Again, if the previously determined front or rear cannot be lowered, determination is made by block 88 if the opposite front or rear can be raised. If not, block 91 flashes light 74 that the desired alignment has yet to be achieved. After alignment has been achieved and recognized at block 77 and the appropriate signal sent to light 74 via block 78 (FIG. 2A), a timer circuit represented by block 92, rechecks the alignment of the vehicle chassis after a preset time period, such as one, two, etc., hours by the previous described sequence, and will make the needed correction, preferably by exhausting air from the high side air springs, in order to maintain the system alignment.

It is understood that if left side 63 of the vehicle is determined by block 81 to be the high side, the same procedure is performed as discussed above for the right side.

Also, if the front end is determined to be out of level at block 84, the same procedure is performed for the front end as discussed above for the rear end. It is preferred that the air spring or springs on the high side or end be lowered before the air spring or springs on the lower side or end be raised since this involves only exhausting air from the individual air spring which will not deplete the supply of pressure air in reservoir 22. However, if necessary, the appropriate air spring can be raised by supplying it with additional pressurized fluid from reservoir 22. This feature avoids prematurely using the supply of pressurized fluid from reservoir 22.

Thus, the ECU initially determines, depending upon the reading received from level indicating device 65, whether the amount of unevenness is too great to be compensated for by the system and to initially alert the operator to relocate the vehicle. This avoids the need to attempt the alignment of the vehicle body by actuation of the appropriate air springs only then to find out that the vehicle body cannot be aligned due to the excessive unevenness of the terrain. This saves time and unnecessary manipulation of the air spring components, fluid supplies, etc. Also, the system determines which side of the vehicle is the high side and then whether it can be compensated and, again, whether this unevenness can be compensated for and then which corner or end of the high side can be lowered to bring the vehicle body into alignment with the artificial horizon or predetermined datum stored in ECU 42.

Again, air is preferably exhausted from the high side air springs or just a corner air spring rather than introduce air into the lower air springs to achieve the desired level to conserve the stored pressurized fluid. Also, it is preferred to lower the vehicle chassis, sides, or corners to achieve the desired levelness as opposed to raising one side or corner thereof to achieve the desired levelness, since a lower vehicle chassis, when stationary, facilitates the ingress and egress of the occupants into and out of the vehicle chassis. Thus, if the vehicle chassis was initially raised to achieve the levelness, it would make the ingress and egress slightly more difficult. Again, it is not the height of the vehicle chassis above the wheels or axles that is controlling; it is the adjusting of the alignment of the vehicle body to a preset artificial horizon that is utilized by the improved system of the present invention.

ECU 42 preferably includes a standard microchip that can be programmed by one skilled in the art to provide those features discussed above and shown in FIGS. 2–4.

Figure 3B:
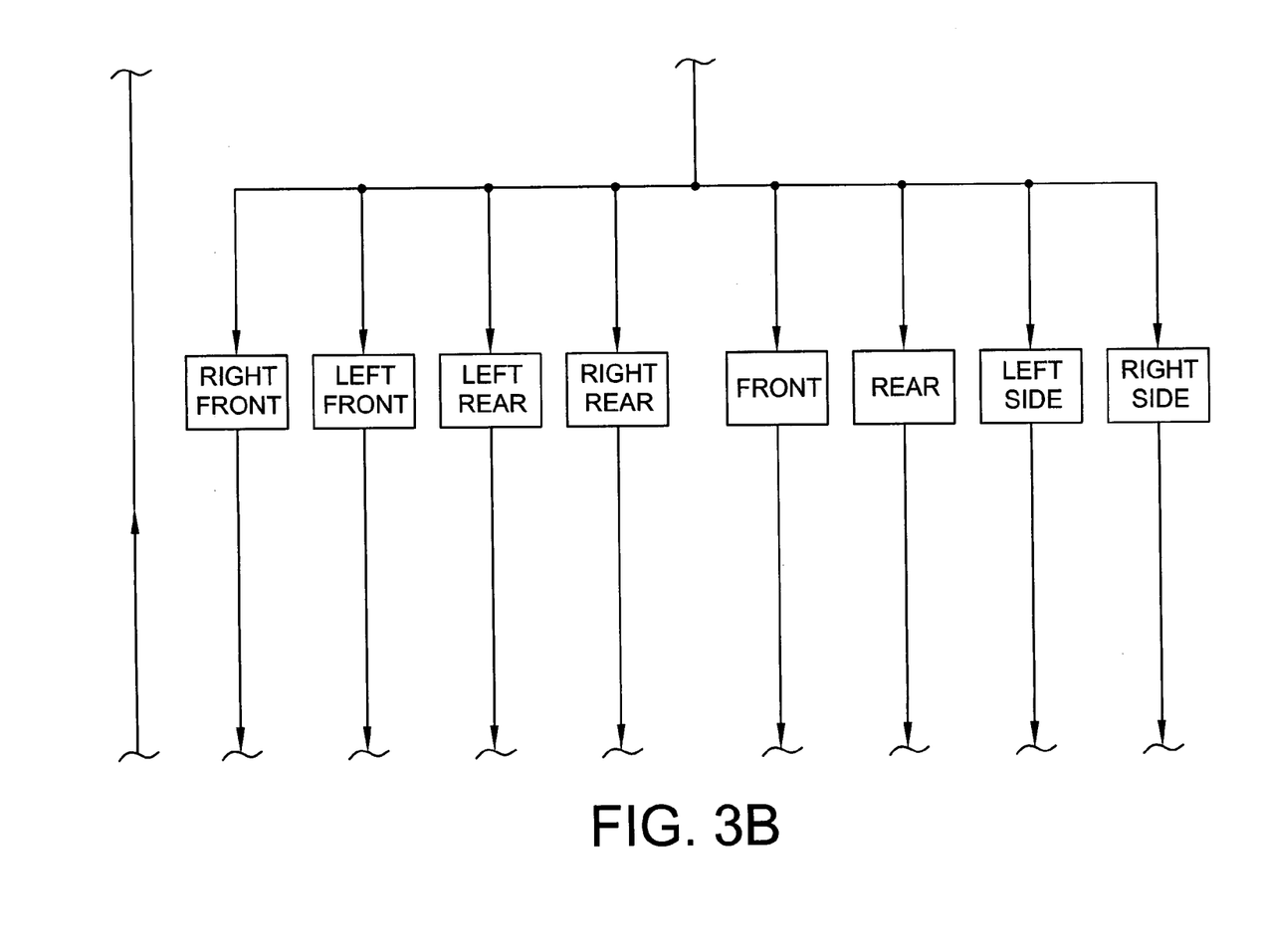
Figure 3C:
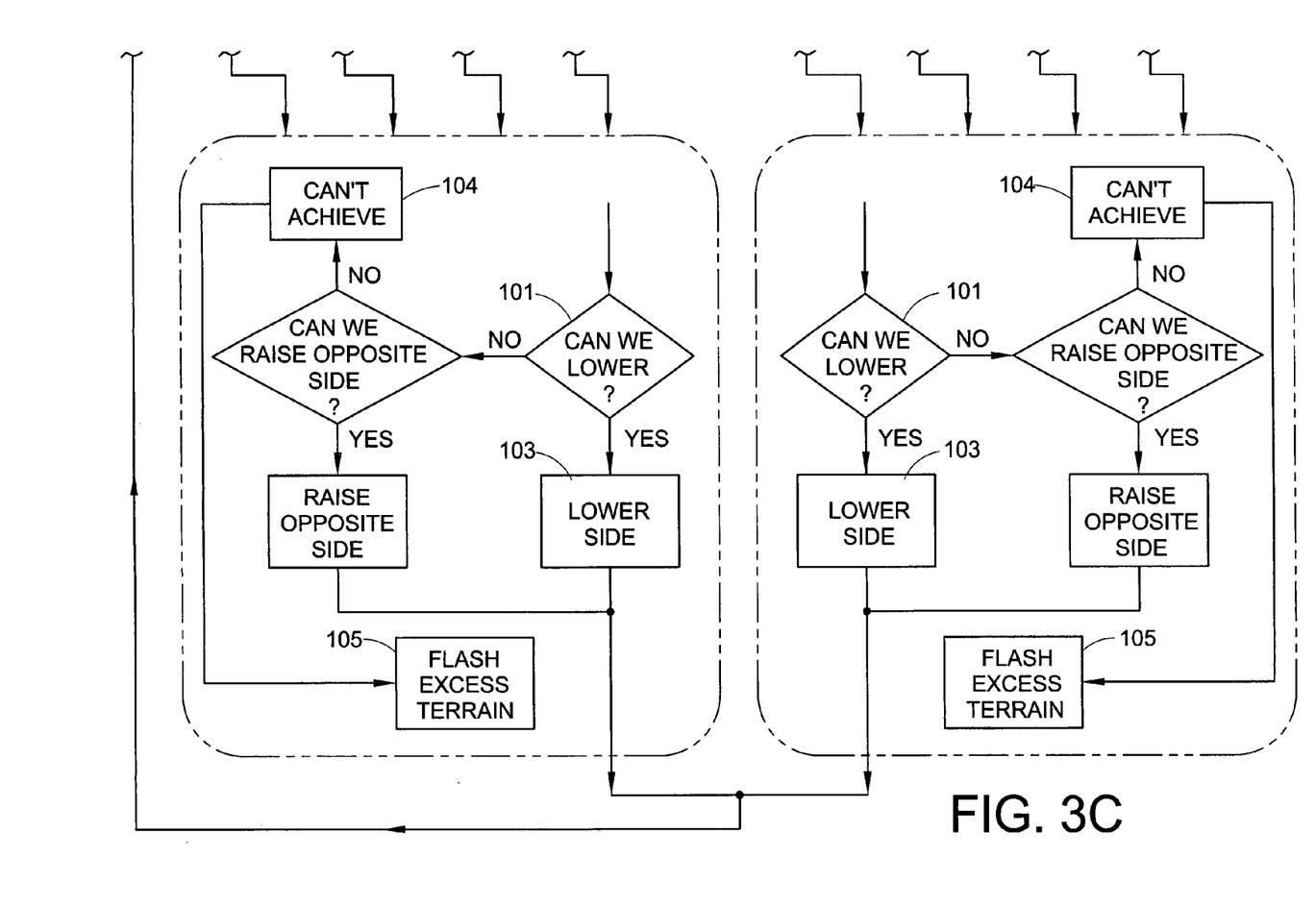

A modified embodiment of the improved method is shown in FIGS. 3A–3C. After a determination is made at block 79 that the magnitude of unlevelness is within the capability of the system, a determination is then made at block 100 as to what is the direction that is out of alignment, namely, as shown in FIG. 3B, whether it is the right front, left front, left rear, right rear, or entire front, the entire rear, the entire left side, or the entire right side of the vehicle chassis. After this determination is made by one of the blocks as shown in FIG. 3B, the system proceeds to the blocks of FIG. 3C which then determines at block 101 whether the location that is out of alignment can be sufficiently lowered and, if so, whether it would be the lower side as determined by block 102 or lower corner as determined by block 103. Again, if the out of alignment location cannot be effectively lowered, the system then determines, as shown by the alternate blocks in FIG. 3C, whether the opposite location, whether it be a side, end, or corner, can be raised to compensate for the misalignment. Again, light 74 will be flashed as shown by blocks 105 if aligning the misaligned area cannot be achieved, in a similar manner as discussed above for the embodiment of FIG. 2. After it has been determined that the desired alignment can be achieved by lowering a particular location on the vehicle chassis, the appropriate air spring is actuated through the appropriate control valve 2831 for exhausting air from one or more of the air springs or, if necessary, to supply air to the appropriate air spring via the associated control valve to raise the unlevel corner, side, or end of the vehicle chassis.

The difference between the method of FIGS. 2 and 3 is that the method shown by the flow diagrams in FIG. 2 initially determine which side is out of alignment, after which it is determined whether it is the front or rear of that side that needs to be adjusted, whereas the method depicted by the flow diagram of FIG. 3 determines immediately which location of the vehicle chassis is out of alignment for subsequent correction.

Figure 4:
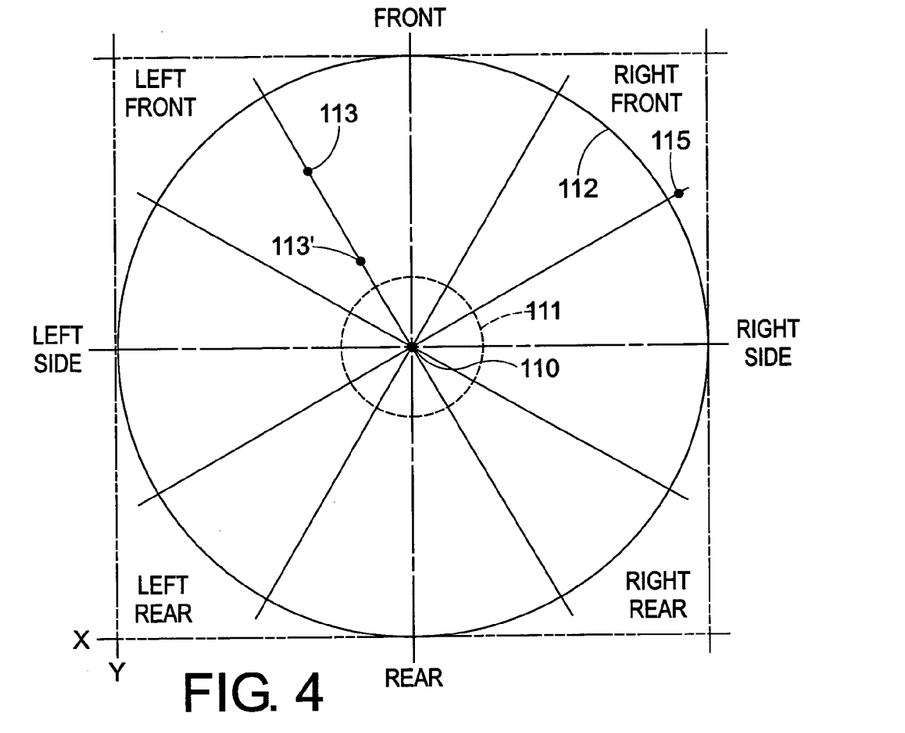
FIG. 4 is a diagrammatic representation of the manner in which the vehicle chassis is aligned by the methods shown by the flow diagrams of FIGS. 2 and 3.

FIG. 4 is another diagrammatic representation of how the system functions to achieve the alignment with respect to the analog or digital signal supplied by accelerometer 65. Center point 110 represents the exact alignment in both the X and Y axis determined by accelerometer 65. In this situation, the accelerometer will output signals corresponding to a midrange value or a value around the accelerometer's calibrated midpoint 110 from both the X and Y axis readings which indicates that both planes are level with the predetermined datum. The inner dot-dash circle 111 represents that position which, when reached, will indicate that the vehicle chassis or, alternatively, the floor or other part of the vehicle chassis being monitored, is substantially aligned with the predetermined datum. Outer concentric circle 112 represents the maximum unlevelness that can be compensated for by the vehicle and its suspension system.

Figure 2B:
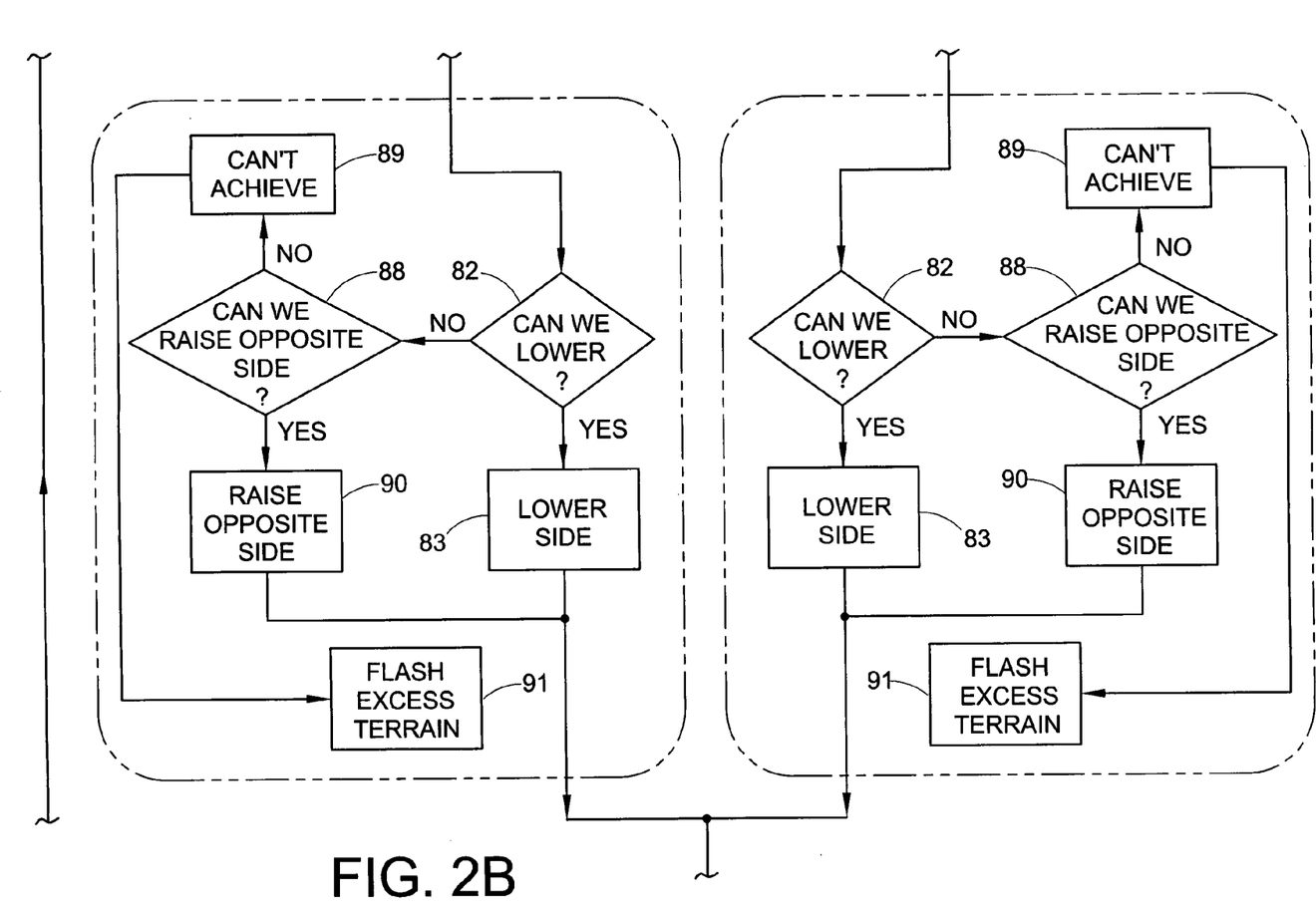
Figure 2C:
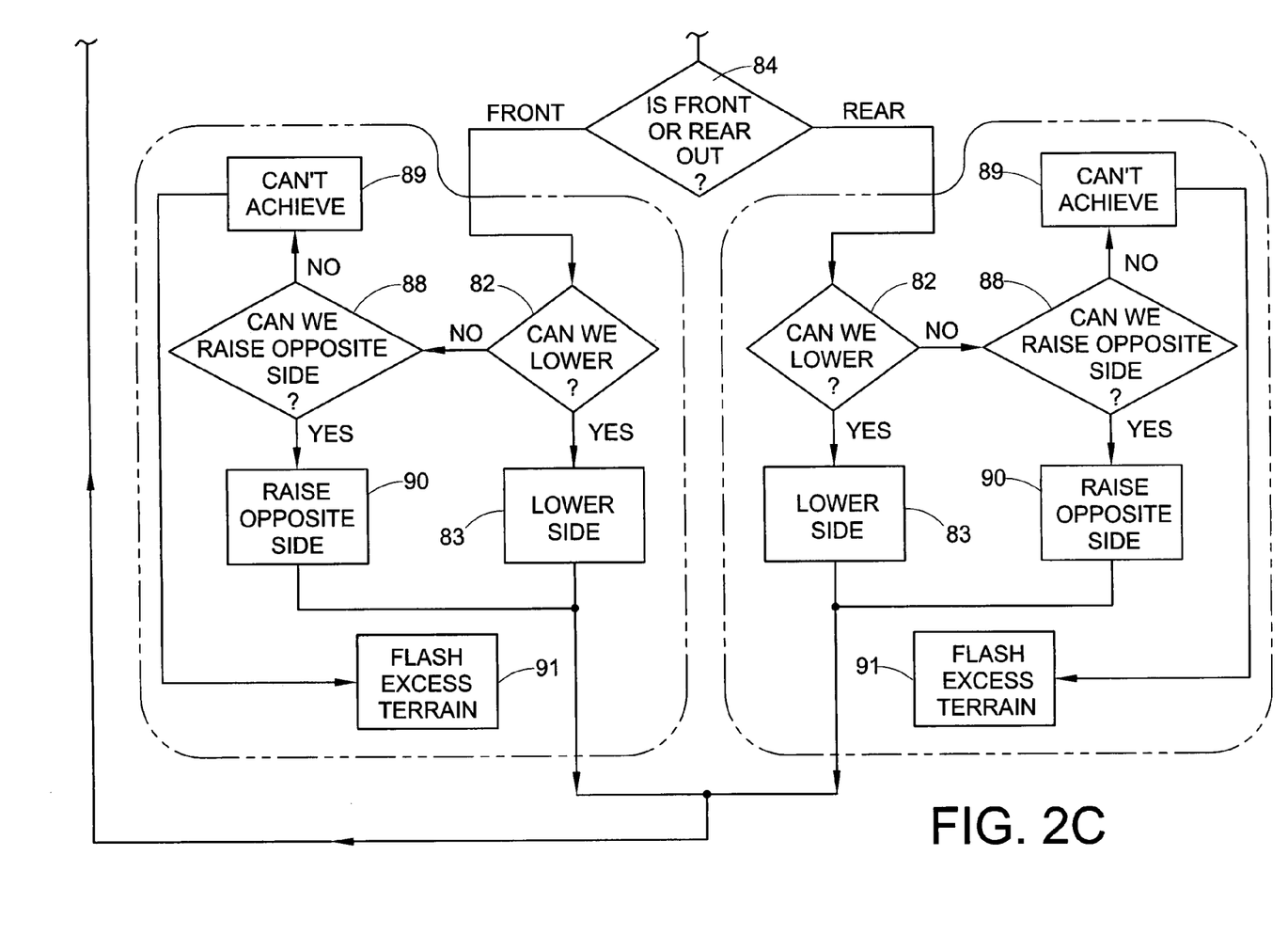

In the particular example of FIG. 4, upon the output signal exceeding the value represented by circle 112, it will indicate that the misalignment or tilt is excessive and cannot be compensated for by the vehicle suspension system, such as represented by block 79 of FIG. 2A or other blocks 89, FIGS. 2B and 2C. As an example, assume that the two signals provided by accelerometer 65 intersect at point 113, which indicates that the front part and left side must be lowered until this point reaches inner circle 111. If the measured point falls within inner circle 111, no further alignment is required by the system. It will be appreciated that such a determination of excessive misalignment can be used in addition to or as an alternative to the end-of-travel analysis described above. However, should this point value fall outside of outer circle 112, such as shown by point 115, the system then indicates that too great a degree of misalignment exists and the capability of the suspension system to correct the misalignment is exceeded.

Under certain circumstances, it may be determined that the orientation of the chassis is or was within the capability of the suspension system to level but after one or more leveling operations a level condition cannot be achieved. These situations are represented by blocks 89 and 91 in FIGS. 2B and 2C, as well as blocks 104 and 105 in FIG. 3C. An example of such a situation might be where the operator has inadvertently parked the vehicle adjacent a foreign object that impedes the lowering of a portion of the chassis. In such a situation, the suspension system could have the capacity to fully level the vehicle, but the foreign object will only permit the chassis to be partially leveled. In FIG. 4, for example, the initial orientation of the chassis is indicated by the point 113 and the partially leveled condition is indicated by point 113'. Under such a circumstance, an indication, such as a flashing light or an audible signal, for example, can be output, such as from control panel 70, for example, to the operator of the vehicle to indicate that the vehicle has been partially leveled but remains outside of the fully leveled condition. Thus, the operator is given the option to reposition the vehicle for full leveling or accept the existing partially leveled condition.

Figure 10:
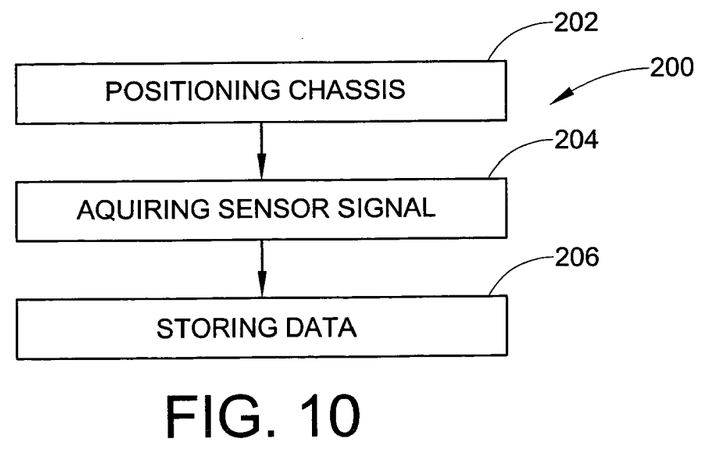
FIG. 10 is a flow diagram of one exemplary method of calibrating a sensor to a predetermined datum.

It is to be distinctly understood that the artificial horizon or predetermined datum referred to herein is not in any way limited to a horizontal or substantially horizontal plane. Rather the predetermined datum can be a plane aligned in any desired orientation relative to the X-axis, Y-axis or any combination thereof without departing from the principles of the present invention. One method 200 of calibrating the predetermined datum is illustrated in FIG. 10, and includes physically positioning the vehicle chassis in the desired orientation, such as where the floor of the chassis is substantially horizontal or tilting from back to front with the front being substantially lower than the back, for example, as indicated in block 202. Once the vehicle chassis is physically oriented, a signal indicating the orientation is acquired from the alignment sensor, as indicated in block 204, and the data associated with the signal is stored in the ECU as alignment data, as indicated in block 206. Thereafter, the system operates as discussed above and repeatedly compares the signal's output from the alignment sensor to the alignment data in the ECU.

Thus, the improved system and method of the present invention enables a vehicle chassis and, in particular, the floor or other wall of an RV, trailer or other structure, to be aligned easily and efficiently by utilizing the existing air suspension ride system of the vehicle, by the addition of accelerometer 65 or other type of alignment sensor in combination with ECU 42, which has been programmed according to the flow diagrams shown in FIGS. 2 and 3. ECU 42 interprets the return values from the X and Y plane readings provided by accelerometer 65 and makes height adjustments to the vehicle via the height control componentry and, in particular, the ride suspension air springs, in order to get the vehicle chassis aligned with the predetermined datum, irrespective of the orientation of the ground, wheels or axles of the vehicle. The system preferably uses the existing ECU unit which is used for the normal ride suspension system and leveling with various modifications thereto in order to achieve the flow diagram and the results shown in FIGS. 2 and 3.

The control system of the present invention also is provided with suitable interlocks that act to selectively deactivate at least a portion of the horizon leveling system and returns the system to the normal ride height leveling upon actuation of switches 45 and/or 49. Immediately upon any of these switches being actuated, the ECU preferably automatically disengages the automatic leveling system of the present invention. Also, speedometer 59 and/or another suitable movement-sensing component is preferably connected with ECU 42, such as through line 60, for example, to further signal ECU 42 to selectively deactivate the horizon leveling system upon the vehicle being put into motion. Thus, where the speedometer or other device output a signal indicative of a speed greater than about zero (0) mph, one of the alignment sensor and at least a portion of the ECU can be deactivated. Also, leaving "Park" or releasing the emergency brake could optionally signal ECU 42 to disengage the leveling system. As discussed above, the system initially attempts to adjust the height of the vehicle by exhausting air from the high side or end air springs to conserve the stored pressurized fluid in the reservoir 22. However, if necessary, air can be supplied to the appropriate air springs from reservoir 22 through the appropriate individual control valves 28–31 to raise that portion of the vehicle body to compensate for any misalignment if necessary and/or if desired.

It is readily understood that air suspension ride systems, other than that shown in FIG. 1, could be utilized without affecting the concept of the invention, since one of the main features is the setting of the artificial horizon level and the adjusting of the appropriate air spring/springs to achieve this position, which is determined through an alignment sensor or level detection device, such as accelerometer 65, for example. Again, other types of level detecting devices could be utilized without affecting the concept of the invention. Likewise, the present system can be used on stationary equipment other than vehicles, and the air springs replaced with hydraulic pressure members, etc., without effecting the invention.

While the invention has been described with reference to the foregoing embodiments and considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as they come within the scope of the appended claims.

The invention claimed is:

1. A method of positioning a vehicle chassis of a vehicle in approximate alignment with a predetermined datum, the vehicle having at least one axle and a fluid suspension system consisting of a plurality of fluid suspension members disposed between the axle and the chassis, a control device, a pressurized fluid source and an exhaust passage in fluid communication with the plurality of fluid suspension members through the control device, and an electronic control unit operatively associated with the control device, the method comprising steps of:
   a) providing an alignment sensor supported on the chassis for outputting a signal indicative of an orientation of the chassis to the electronic control unit;
   b) providing alignment data indicative of the predetermined datum and end-of-travel data indicative of an extreme orientation of the chassis, and storing the alignment data and end-of-travel data within the electronic control unit;
   c) acquiring a signal output by the alignment sensor;
   d) comparing the signal from the alignment sensor to the alignment data and the end-of-travel data stored in the electronic control unit and determining whether at least one corner of the vehicle chassis is higher than the predetermined datum such that the at least one corner could be lowered to approximately align the vehicle chassis with the predetermined datum; and,
   e) selectively operating the control device to permit fluid communication between one or more of the fluid suspension members and one of the pressurized fluid source and the fluid exhaust until the signal from the alignment sensor approximately corresponds to the alignment data.

2. A method according to claim 1, wherein the control device includes a valve block and a plurality of actuatable valves supported on the valve block, and step e) includes the electronic control unit selectively actuating one or more of the plurality of valves.

3. A method according to claim 1 further comprising steps of determining whether the vehicle is in one of a moveable condition and a moving condition, and deactivating at least one of the alignment sensor and a portion of the electronic control unit when the vehicle is in one of said moveable condition and said moving condition.

4. A method according to claim 1 further comprising a step of calibrating the alignment sensor prior to step c).

5. A method according to claim 4, wherein the step of calibrating includes positioning a wall of the chassis in substantial alignment with the predetermined datum, acquiring a signal output from the alignment sensor with the chassis in substantial alignment with the predetermined datum, and storing data indicative of the signal output from the alignment sensor in the electronic control unit as the alignment data.

6. A method according to claim 1, wherein at least one corner of the chassis is determined to be higher than the predetermined datum, and step e) includes exhausting pressurized fluid from one or more of the fluid suspension members to lower the at least one higher corner of the chassis.

7. A method according to claim 1 further comprising repeating steps c) and d).

8. A method according to claim 1, wherein at least one corner of the chassis is determined to be higher than the predetermined datum, and the method further comprises a step of determining using the end-of-travel data whether a fluid suspension member associated with the at least one corner of the chassis that is determined to be higher than the predetermined datum can be lowered a distance sufficient for alignment with the predetermined datum prior to step e).

9. A method according to claim 8, wherein the fluid suspension member associated with the corner of the chassis that is determined to be higher than the predetermined datum can be sufficiently lowered for alignment with the predetermined datum, and step e) includes exhausting pressurized fluid from the at least one fluid member.

10. A method according to claim 8, wherein the fluid suspension member associated with the corner of the chassis that is determined to be higher than the predetermined datum cannot be sufficiently lowered for alignment with the predetermined datum, and step e) includes filling pressurized fluid into a different one of the plurality of fluid suspension members.

11. A method of positioning a vehicle chassis of a vehicle in approximate alignment with a predetermined datum, the vehicle having at least one axle and a fluid suspension system consisting of a plurality of fluid suspension members disposed between the axle and the chassis, a control device, a pressurized fluid source and an exhaust passage in fluid communication with the plurality of fluid suspension members through the control device, and an electronic control unit operatively associated with the control device, the method comprising steps of:
   a) providing an alignment sensor supported on the chassis for outputting a signal indicative of an orientation of the chassis to the electronic control unit;
   b) providing a height detector supported between the axle and the chassis, the height detector outputting a signal indicative of the position of the chassis relative to the axle;
   c) providing alignment data indicative of the predetermined datum and end-of-travel data indicative of an extreme position of the chassis relative to the axle, and storing the alignment data and the end-of-travel data within the electronic control unit;
   d) acquiring a signal output by the alignment sensor;
   e) acquiring a signal from the height detector indicative of the position of the chassis relative to the axle;
   f) comparing the signal from the alignment sensor to the alignment data stored in the electronic control unit and determining whether at least one corner of the vehicle chassis is higher than the predetermined datum such that the at least one corner could be lowered to approximately align the vehicle chassis with the predetermined datum;
   g) comparing the signal from the height detector to the end-of-travel data; and, h) selectively operating the control device to permit fluid communication between one or more of the fluid suspension members and one of the pressurized fluid source and the fluid exhaust until the signal from the alignment sensor approximately corresponds to the alignment data.

12. A method according to claim 11 further comprising steps of determining whether the difference between the signal from the height detector and the end-of-travel data exceeds a predetermined value, and the electronic control unit selectively operating the control device to discontinue pressurized fluid flow therethrough if the predetermined value is exceeded.

13. A control system adapted to position a vehicle chassis of a stationary vehicle in substantial alignment with a predetermined datum, the control system comprising:
   a plurality of fluid suspension members adjustably supporting the chassis on an axle of the stationary vehicle;
   a pressurized fluid source operatively connected to the fluid suspension members;
   a control device operatively connected between the fluid source and the fluid suspension members for controlling pressurized fluid flow to and from the fluid suspension members;
   an alignment sensor supported on the chassis for outputting a signal indicative of the orientation of the chassis;
   an electronic control unit operatively connected to the control device and the alignment sensor, the electronic control unit operative to receive the signal from the alignment sensor, to determine whether at least one corner of the vehicle chassis is higher than the predetermined datum, and to selectively activate the control device to adjust one or more of the fluid suspension members until the signal from the alignment sensor indicative of the chassis being approximately aligned with the predetermined datum; and,
   a speedometer adapted to output a signal indicative of a speed of the vehicle;
   the electronic control unit is in operative communication with the speedometer and receives therefrom the signal indicative of the speed of the vehicle, and the electronic control unit is adapted to determine whether the vehicle is in one of a moveable condition and a moving condition, and to selectively deactivate at least a portion of the control system if the vehicle is in one of the moveable condition and the moving condition.

14. A control system according to claim 13, wherein the predetermined datum is oriented in alignment with a substantially horizontal plane.

15. A control system according to claim 13, wherein the alignment sensor is one of an accelerometer, a tilt sensor, a gyroscopic sensor and a transducer.

16. A control system according to claim 13, wherein the control device includes a plurality of selectively displaceable valves, and the electronic control unit is adapted to selectively actuate one or more of the plurality of valves.

17. A control system according to claim 13, wherein the alignment sensor is centrally supported on the chassis.

18. A control system according to claim 13 further comprising a height detector secured between the axle and the chassis and operatively connected to the electronic control unit for outputting a signal indicative of a distance between the axle and the chassis.

19. A control system according to claim 18, wherein the height detector is positioned adjacent one of the fluid suspension members.

20. A method of positioning a vehicle chassis of a vehicle in approximate alignment with a predetermined datum, the vehicle having at least one axle and a fluid suspension system including a plurality of fluid suspension members disposed between the axle and the chassis, a control device, a pressurized fluid source and an exhaust passage in fluid communication with the plurality of fluid suspension members through the control device, and an electronic control unit operatively associated with the control device, the method comprising steps of:
   a) providing an alignment sensor supported on the chassis for outputting a signal indicative of the orientation of the chassis to the electronic control unit;
   b) bringing the vehicle to a stop at a first location;
   c) acquiring an alignment signal output by the alignment sensor;
   d) comparing the alignment signal from the alignment sensor to alignment data stored in the electronic control unit and determining that the vehicle chassis is out of alignment with the predetermined datum;
   e) determining whether the alignment of the vehicle chassis is within the capability of the plurality of fluid suspension members to correct; and,
   f) wherein the alignment exceeds the capability of the plurality of fluid suspension members to correct, indicating that that capability of the plurality of fluid suspension members to correct the alignment of the vehicle chassis is exceeded, bringing the vehicle to a stop at a second location different from the first location, and repeating steps c) through g); or,
   g) wherein the alignment is within the capability of the system to correct, selectively operating the control device to permit fluid communication between one or more of the fluid suspension members and one of the pressurized fluid source and the fluid exhaust until the signal from the alignment sensor approximately corresponds to the alignment data.

* * * * *